United States Patent [19]

Moldestad

[11] 4,211,439
[45] Jul. 8, 1980

[54] SAFETY DEVICE FOR HOSE CONNECTIONS

[76] Inventor: Jon P. Moldestad, 1015 Cadillac Way, #213, Burlingame, Calif. 94010

[21] Appl. No.: 928,097

[22] Filed: Jul. 26, 1978

[51] Int. Cl.² ............................................. F16L 19/02
[52] U.S. Cl. ........................................ 285/27; 285/45; 285/354; 285/376; 285/DIG. 15
[58] Field of Search ................. 285/DIG. 15, 45, 328, 285/27, 354; 339/186 R, 186 M, 186 T, 187

[56] References Cited

U.S. PATENT DOCUMENTS

| | | | |
|---|---|---|---|
| 1,031,587 | 7/1912 | Reisik | 285/DIG. 15 X |
| 1,842,897 | 1/1932 | Culp | 285/DIG. 15X |
| 2,935,338 | 5/1960 | Mills, Jr. | |
| 3,008,116 | 11/1961 | Blanchenot | |
| 3,096,135 | 7/1963 | Feustel et al. | |
| 3,097,905 | 7/1963 | Shearer et al. | |
| 3,170,667 | 2/1965 | Szohatzky | 285/DIG. 15 X |
| 3,194,588 | 7/1965 | Buckey et al. | 285/DIG. 15 X |
| 3,287,031 | 11/1966 | Simmons et al. | 285/DIG. 15 X |
| 3,326,580 | 6/1967 | Munier et al. | |
| 4,111,514 | 9/1978 | Brishka et al. | 339/186 R |

FOREIGN PATENT DOCUMENTS

| | | | |
|---|---|---|---|
| 670440 | 9/1963 | Canada | 285/DIG. 15 |
| 1187435 | 2/1965 | Fed. Rep. of Germany | 285/DIG. 15 |
| 771968 | 4/1957 | United Kingdom | 285/DIG. 15 |
| 863430 | 3/1961 | United Kingdom | 285/DIG. 15 |

Primary Examiner—Thomas F. Callaghan
Attorney, Agent, or Firm—Kinney, Lange, Braddock, Westman and Fairbairn

[57] ABSTRACT

A special safety device prevents two fluid lines from being connected if the fluid in the first line can not be safely received by the second line. The danger of connecting the two lines may be, for example, because the fluid carried by the first line presents a safety hazard if received by the second line, or because the fluid in the first line is at too high a pressure or temperature to be safely received by the second line. The safety device includes first and second cams which are connected to the two lines. The first cam has cam keys in a first pattern which is indicative of characteristics of the fluid transmitted by the first fluid line, while the second cam has cam keys in a second, complimentary pattern which is indicative of characteristics of the fluid which may be safely received by the second fluid line. The first and second cams are positioned with respect to the male and female couplings of the fluid lines such that the male and female couplings can not even be partially engaged unless the first and second patterns match one another in a complimentary manner sufficiently to allow the first and second cams to pass one another.

3 Claims, 7 Drawing Figures

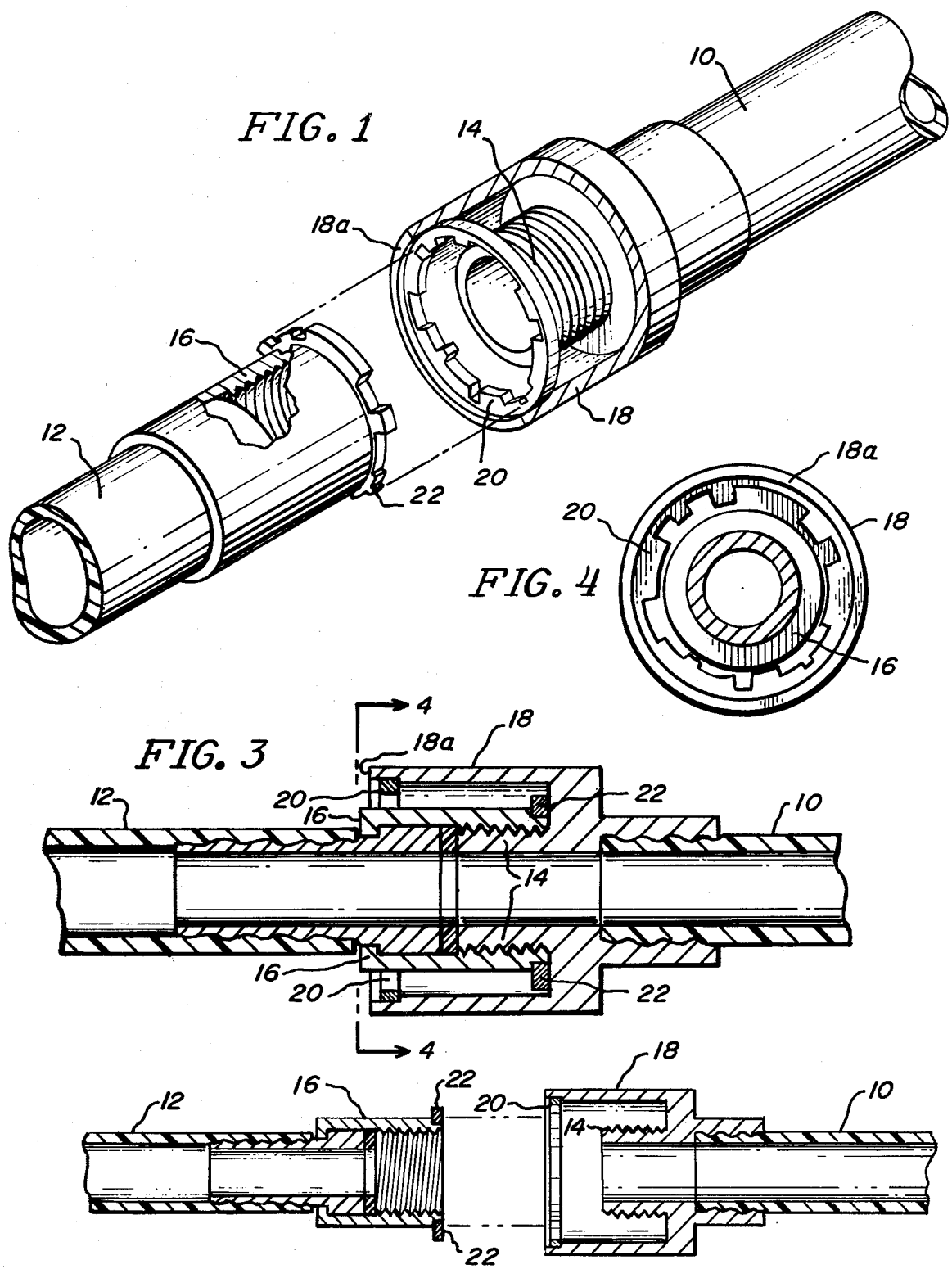

SAFETY DEVICE FOR HOSE CONNECTIONS

BACKGROUND OF THE INVENTION

The present invention is related to safety devices. In particular, the present invention is a safety device for use in fluid transfer systems.

A wide variety of fluid materials are transferred through flexible hoses. These materials include extremely hazardous gases and liquids. Each year, hundreds of lives are lost and millions of dollars in property damage occurs due to the unintentional combining of unsuitable or incompatible gases and liquids. This type of accident is common to virtually all industries which handle toxic, flammable, or otherwise hazardous liquids or gases.

For example, recently a commercial aircraft was accidentally fueled with the wrong jet fuel. As a result, just after take-off, the airplane engines failed and the plane crashed, killing several people. In another example, a young mother was accidentally suffocated to death shortly after giving birth when an oxygen line was inadvertantly connected to an anesthesia gas line. In still another example, eight persons died and 45 persons were injured when a supply truck accidentally pumped the wrong substance into a plant storage tank, which resulted in toxic vapors spreading throughout the plant. Similar accidents continue to occur at an alarming rate.

At the present time, efforts to avoid these types of accidents in flexible hose material transfers generally have been ineffective. In some cases, special threading, color coding, labeling, sizing or the like have been attempted. In many cases, however, these attempts have been easily avoided or circumvented by the personnel making the hose connections. In any case, these systems have found only limited use at the present time.

In electrical systems, a standardization of plugs, voltages, amperages, frequencies, and the like have provided safety against unintentional improper connection of incompatible electrical circuits, components, or lines. Similar standardization in fluidic systems, however, has heretofore been unavailable or unused.

SUMMARY OF THE INVENTION

The present invention is a safety device which prevents the unintentional or even intentional combining of unsuitable or incompatible gases or liquids. The safety device of the present invention is amenable to nearly all fluid transfer systems using fluid lines, particularly the large bulk transfer systems. Furthermore, the present invention can be retrofitted to existing systems. As used in this application, the term "fluid line" is intended to include both flexible lines or hoses and inflexible lines with a fixed coupling.

In the present invention, a first prescreening means is connected to a first fluid line which transmits a fluid. Similarly, a second prescreening means is connected to a second fluid line which is adapted to receive a fluid when coupled to another fluid line. The first prescreening means has first cam key means in a first pattern which is indicative of the characteristics of fluids which may be safely received by the second fluid line. The first and second prescreening means are positioned with respect to the male and female couplings such that the male and female couplings cannot be even partially engaged, unless the first and second patterns match one another in a complimentary manner sufficiently to allow the first and second prescreening means to pass one another.

In other words, the present invention provides a cam-keyed prescreening before any coupling of two fluid lines can occur. This prescreening can, for example, screen out all but one of thousands of substances so that only a fluid line which carries that one substance can be coupled to the second fluid line, even though the first fluid line is of the same size as other lines carrying incompatible materials, and even though the coupling on the first fluid line is identical to couplings on other fluid lines which carry incompatible materials.

Similarly, the present invention can be used to pre-screen for pressures or temperatures of the fluid materials. Even though the first line carries the desired material, coupling will still not be possible if the desired material is at too high a pressure or temperature.

BRIEF DESCRIPTION OF THE DRAWINGS

FIG. 1 is a perspective view of one preferred embodiment of the safety device of the present invention using first and second cam key plates associated with male and female threaded hose couplings.

FIGS. 2 and 3 are cross-sectional side views of the device of FIG. 1 with the male and female couplings separated, and with the male and female couplings engaged.

FIG. 4 is a cross-sectional view taken along line 4—4 of FIG. 3.

DETAILED DESCRIPTION OF THE PREFERRED EMBODIMENTS

Figure 5:
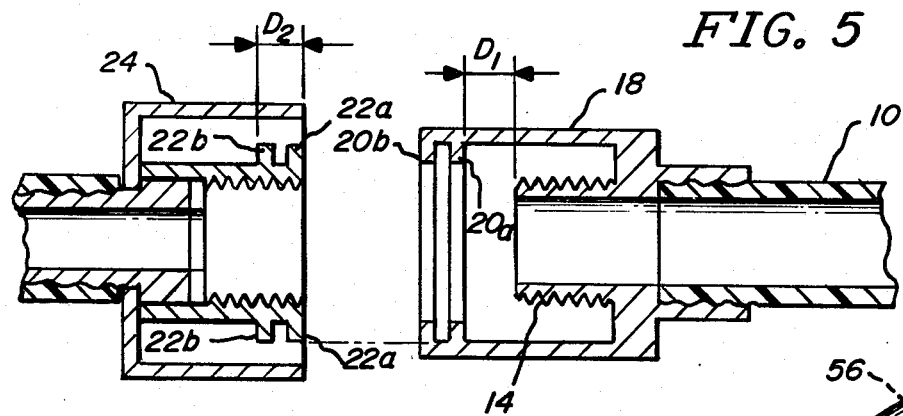
FIG. 5 is a cross-sectional view showing another embodiment of the present invention which has two cam key plates associated with the male coupling and two cam key plates associated with the female coupling, and also includes a protective shield which protects cam keys from impact damage.

FIGS. 1–4 show a first preferred embodiment of the safety device of the present invention. The first fluid line or hose 10 and a second fluid line or hose 12 are to be connected together. First line 10 has a male threaded coupling 14, while second hose 12 has a female threaded coupling 16. As illustrated in the Figures, female coupling 16 is rotatable with respect to second line 12 so that male and female couplings 14 and 16 can be threaded together without requiring lines 10 and 12 to be twisted. Alternatively, the male threaded coupling could be rotatable with respect to first line 10, or both could be rotatable.

Although male and female threaded couplings 14 and 16 are mating and could be connected together, the safety device of the present invention prevents their being even partially engaged or coupled unless the two lines are compatible with each other. In other words, both must be intended to carry the same fluid material at the same pressure or temperature. As a result, accidents caused by combining unsuitable or incompatible gases or liquids are prevented.

As shown in FIGS. 1–4, the safety device of the present invention includes a cup-shaped shield and holder 18 which surrounds male coupling 14 and supports first cam key plate 20. A second cam key plate 22 is attached to the female coupling 16. First cam key plate 20 and second cam key plate 22 have cam keys which are cut in a particular pattern which is indicative of the characteristics of the fluid handled by the particular fluid line. For example, if first line 10 is the transmitting fluid line and second line 12 is the receiving line, the patterns of cam keys of first plate 20 have a first pattern which is indicative of the charactertistics of the fluid which is transmitted by first fluid line 10. Similarly, second plate 22 has cam keys in a second, complimentary pattern which is indicative of characteristics of fluids which may be safely received by second fluid line 12.

As illustrated in FIGS. 1-4, cam plates 20 and 22 are positioned with respect to male and female couplings 14 and 16 so that the threads of male and female couplings 14 and 16 cannot even partially engage unless the first and second patterns on cam plates 20 and 22 match to an extent which permits second cam plate 22 to pass first cam plate 20 and into the cup-shaped shield 18.

FIGS. 1 and 2 show the two lines and couplings before the cam keys 20 and 22 have been inserted and pass one another. FIGS. 3 and 4 show how the two couplings can be threaded together once cam plates 20 and 22 pass one another.

The first and second cam plates 20 and 22, therefore, provide a prescreening which makes it impossible to couple together two fluid lines unless it is safe to do so. This prescreening can, for example, prevent the first and second lines from being connected together unless first line 10 is supplying a particular fluid, such as JP5 jet fuel. The radian depth and width of the key cuts of cam plates 20 and 22 can be selected so that a single fluid or a class of fluids will be permitted to pass. Similarly, the prescreening performed by the cam plates can prevent lines carrying fluids at incompatible pressures or temperatures from being connected. Even though line 10 carries the desired fluid material, coupling may still be prevented if the pressure or temperature of the fluid supplied by first line 10 is too high or too low to be safely handled by second line 12.

The pressures or temperatures can be defined by use of two key cuts of different depth which define the maximum and minimum pressures which are carried by the one line and which can be received by the other line. If the range defined by first cam key plate 20 is within or equal to the range of pressures or temperatures indicated to be acceptable by the keys of second plate 22, coupling can occur, provided that the other cam keys also mate.

As shown in FIGS. 1-4, first plate 20 is recessed slightly with respect to the outer edge or lip 18a of a cup-shield 18. This lip 18a permits easier insertion of second plate 22 through plate 20, since it helps locate the position that second plate 22 can assume while the operator attempts to insert second plate 22 through first plate 20. In preferred embodiments, a locating arrow, line, mark, or other indication (not shown) is provided on both shield 18 and coupling 16 so that the operator knows the proper orientation of plates 20 and 22 if they are to pass one another. This avoids the necessity of the operator having to rotate one of the cam plates through an entire 360° rotation with respect to the other plate in order to be sure that the plates do not mate. If the two arrows are aligned with one another and the two cam plates do not pass, the operator knows the two fluid lines are incompatible without having to try any further rotating or testing of the two cam plates.

In one preferred embodiment, cam plates 20 and 22 are not manufactured as a unitary part of either shield 18 or coupling 16. Instead, they are attached to shield 18 and coupling 16 after the use to which lines 10 and 12 will be put is known. This permits standardized manufacture of all parts. Plates 20 and 22 are standardized with respect to the substance, temperature, pressure, and line size and can be labelled and sold for use with the standardized couplings 14 and 16 and shield 18. Once it is decided what fluids will be handled by lines 10 and 12, plates 20 and 22 may either be permanently attached to shield 18 and coupling 16, respectively, or may be bolted or staked in position so that they can be changed at some later time if the use of lines 10 or 12 changes. It is important, however, that plates 20 and 22 be securely fastened to shield 18 and coupling 16 so that they cannot be easily removed or simply become unattached during normal use. This, of course, would defeat the purpose of the safety device.

In addition to holding cam plate 20 and preferably providing a locating lip 18a, cup-shaped shield 18 also provides to other important features. First, shield 18 acts as an impact protector for the threads of male coupling 14. Second, it provides protection against spraying or leaking at the connection of lines 10 and 12. This leaking can occur if threaded couplings 14 and 16 are not securely connected together, or no longer can hold the pressure being transmitted due to wear or other factors. If the opening through which the fluid can leak is relatively small and the pressure is sufficiently high, a relatively high velocity jet of fluid material can spray out from the threaded couplings 14 and 16. Shield 18 provides protection against this spraying or leaking.

FIG. 5 shows another embodiment of the present invention which is generally similar to the embodiment illustrated in FIGS. 1-4. The embodiment of FIG. 5 varies from the embodiment shown in FIGS. 1-4 in that two plates 20a and 20b are attached to shield 18 and are positioned in front of threaded male coupling 14. Similarly, two cam plates 22a and 22b are attached to female threaded coupling 16. In addition, a second shield 24 is provided which surrounds female coupling 16 and cam plates 22a and 22b. Shield 24 provides impact protection for the cam keys of plates 22a and 22b, and also provides additional protection against spraying or leaking from the connection.

The use of two sets of cam plates in FIG. 5 provides even further possibility of screening materials. By the use of multiple cam plates, prescreening can be extremely selective.

FIG. 5 further illustrates an important requirement of the present invention when multiple cam plates are used. The distance $D_1$ from cam plate 20a to the beginning of threaded coupling 14 must be greater than the distance $D_2$ from the front of cam plate 22a to the back of cam plate 22b. This is important so that threaded couplings 14 and 16 cannot even partially engage until both cam plates 22a and 22b have passed both cam plates 20b and 20a.

Figure 6:
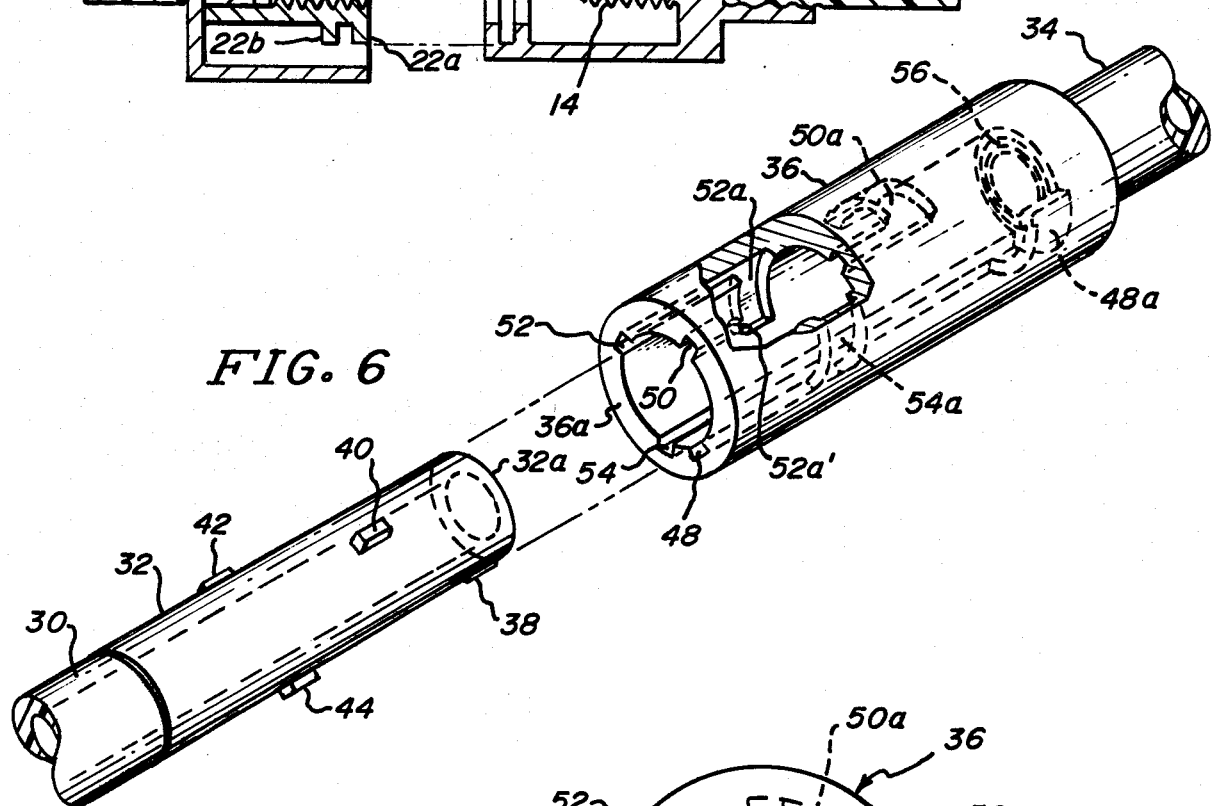
FIG. 6 is a perspective view showing another embodiment of the present invention.
Figure 7:
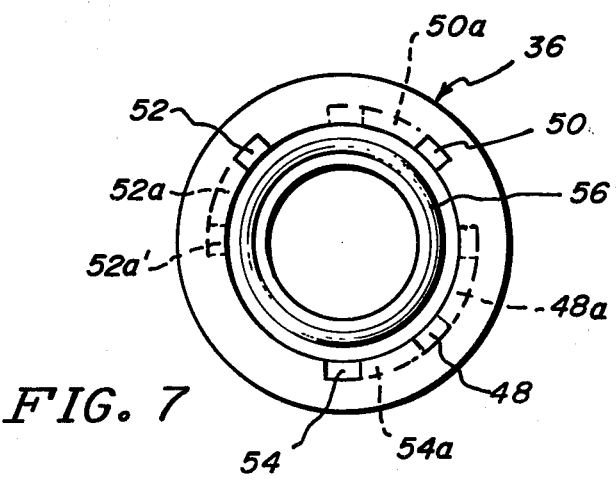
FIG. 7 is an end view of the female cam and coupling member of the embodiment of FIG. 6.

FIGS. 6 and 7 show another embodiment of the present invention which is particularly useful in conjunction with small diameter fluid lines. The embodiments shown in FIGS. 1-5, on the other hand, are particularly useful in bulk fluid handling systems having very large diameter hoses or pipes.

In FIG. 6, line 30 has a male connector 32 attached at one end, while line 34 has a female connector 36 attached to its end. Male connector 32 has keys 38, 40, 42, and 44 displaced at various radians around the circumference of male connector 32. In addition, keys 38, 40, 42, and 44 are at different distances from the end 32a of connector 30.

Connector 36 has four axial keyways 48, 50, 52, and 54, which receive keys 38, 40, 42, and 44, respectively. Each of keyways 48, 50, 52, and 54 extends from surface 36a of connector 36 in a direction parallel to the axis of connector 32 for a distance which depends upon the distance of the corresponding key 38, 40, 42, or 44 from surface 32a of connector 32.

At the ends of each of the axial keyways, 48, 50, 52, and 54 is a keyway or groove extending in a circumferential direction for approximately a quarter turn (90°). These circumferential keyways, designated 48a, 50a, 52a, and 54a, permit a quarter turn of connectors 32 and 36 with respect to one another once connector 32 has been fully inserted into connector 36. When this occurs, the front surface 32a of connector 32 engages an O-ring 56 located at the rear inner end of connector 36. O-ring 56 is preferably of an elastomeric material and provides a fluid-tight seal of the two connectors.

When connector 32 has been fully inserted and turned by 90°, the force against surface 32a by O-ring 56 urges the key ways into a small notch or lip at the front end of each of the circumferential keyways. Notch 52a' at the forward side and end of keyway 52a is an example of this retaining notch. The force of the O-ring tends to hold connector in position and prevents accidental disconnecting and rotation of connectors 32 and 36 with respect to one another unless a positive force is applied along the axes of the connectors which disengages the keys from the retaining notches.

As in the embodiment shown in FIGS. 1-5, the embodiment shown in FIGS. 6 and 7 permits a prescreening of the fluids to be handled by lines 30 and 34. Keys 38, 40, 42, and 44 and axial keyways 48, 50, 52, and 54 are the prescreening cam means, while keys 38, 40, 42, and 44 and circumferential keyways 48a, 50a, 52a, and 54a are the coupling means which actually couple the two lines together. Both the circumferential location of keys 38, 40, 42, and 44, and their respective distances from front surface 32a of connector 32 will determine whether they can be accepted into connector 36. As in the embodiment shown in FIGS. 1-5, the connecting means (the keys and circumferential keyways) cannot even be partially engaged unless connectors 32 and 36 have compatible keys and axial keyways. Depending upon the diameters of connectors 32 and 36, and the thickness of the keys, and the number of keys, a single fluid from a very large number of fluids, or a combination of the proper fluid, and the proper temperature or pressure can be screened by means of a connector system of FIGS. 6 and 7.

In one preferred embodiment, an outer sleeve of connector 32 and an inner sleeve of connector 36 actually carry the key and keyways. A smaller diameter member on hose 30 and a larger diameter outer member on hose 32 receive the two sleeves. In this way, a decision as to a particular key and keyway combination to be used can await determination as to the desired fluids to be carried by lines 30 and 34. The sleeve inserts bearing the keys and keyways are attached, and, in some cases, permantently affixed, once that decision has been made.

In conclusion, the present invention is a safety device which prevents the unintentional or even intentional combining of unsuitable or incompatible gases or liquids. It provides many significant advantages over the prior art.

First, the device is amenable to nearly all fluid transfer systems, particularly large bulk transfer systems.

Second, it can be retrofitted to existing systems by adding a cam plate arrangement such as shown in FIGS. 1-5.

Third, the prescreening which is performed by the safety device of the present invention is done prior to coupling. Not even partial coupling is permitted if the prescreening means indicates the lines are incompatible.

Fourth, the prescreening can be extremely selective as to classes of materials, ranges of pressure, and ranges of temperature which are compatible. Extremely large coupling rejection potential is provided.

Fifth, the invention is particularly suited for use as a universal prescreening system for all types of couplings. Standardization of cam key codes can be implemented on an industry-wide basis.

Sixth, the invention, as illustrated in FIGS. 1-5 provides prescreening for threaded couplings without altering the threads themselves.

Seventh, the invention provides impact protection for male threads in a threaded coupling system.

Eighth, the present invention provides protection against leaking or spraying from a threaded coupling.

Ninth, the present invention is relatively easy to manufacture, both as to the cam keys and as to the remaining portions of the coupling.

Tenth, the present invention is amenable to interchangeable cam key plates or sleeves, so that the prescreening means can be changed when the desired use of the fluid lines changes.

Although the present invention has been described with reference to preferred embodiments, workers skilled in the art will recognize that changes may be made in form and detail without departing from the spirit and scope of the invention.

What is claimed is:

1. In a fluid handling system having first and second fluid lines for handling the fluids, the improvement comprising:

a male threaded connector connected to the first fluid line;

a female threaded connector connected to the second line;

a cup shaped shield means connected to and surrounding the male threaded connector and extending forward of a most forward end of the male threaded connector, the cup shaped shield means providing a shield against fluid sprayed from the male and female threaded connectors when they are joined together;

a female type cam plate carried within the cup shaped shield means forward of the male threaded connector, the female type cam plate having an open central portion and a plurality of keys spaced about its inner periphery surrounding the open portion in a first pattern indicating characteristics of fluids which may be safely carried by the first fluid line;

a male type cam plate connected to the female threaded connector proximate a most forward end of the female threaded connector, the male type cam plate having a plurality of keys circumferentially spaced about its outer periphery in a second pattern indicative of characteristics of fluids which may be safely carried by the second fluid line;

a locating lip portion of the shield means extending forward of the female type cam plate for axially locating the male type and female type cam plates; and wherein the distance from the most forward portion of the female threaded connector and a most rearward portion of the male type cam plate is less than the distance from a most rearward portion of the female type cam plate to the most forward portion of the male threaded connector such that the male and female threaded connectors cannot be even partially engaged unless the first and second patterns match one another in the complementary manner sufficient to permit the male and female type cam plates to pass one another, thereby indicating compatibility of the first and second fluid lines.

2. The invention of claim 1 wherein the female type cam plate includes a first plurality of keys indicative of a first range of fluid pressures transmitted by the first fluid line, wherein the male type cam plate includes a second plurality of complementary keys indicative of a second range of fluid pressures which may be safely received by the second fluid line, and wherein the first and second plurality of keys prevent the female and male type cam plates from passing one another unless the first range is within or equal to the second range.

3. The invention of claim 1 wherein the female type cam plate includes a first plurality of keys indicative of a first range of fluid temperatures transmitted by the first fluid line, wherein the male type cam plate includes a second plurality of complementary keys indicative of a second range of fluid temperatures which may be safely received by the second fluid line, and wherein the first and second plurality of keys prevent the female and male type cam plates from passing one another unless the first range is within or equal to the second range.

* * * * *